United States Patent
Dominique et al.

(10) Patent No.: US 6,400,960 B1
(45) Date of Patent: Jun. 4, 2002

(54) POWER CONTROL OF A COMMUNICATION TRAFFIC CHANNEL WITH DISCONTINUED TRANSMISSION IN THE PRESENCE OF A PRIMARY TRAFFIC CHANNEL

(75) Inventors: Francis Dominique, Rockaway; Andrew R Kostic, Lincoln Park; Martin Howard Meyers, Montclair; Alexandro Salvarani, Edison; Carl Francis Weaver, Hanover Township, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/905,362

(22) Filed: Jul. 13, 2001

(51) Int. Cl.$^7$ .................................................. H04B 7/00
(52) U.S. Cl. .......................................... 455/522; 455/69
(58) Field of Search .............................. 455/69, 522, 553, 455/343, 574

(56) References Cited

U.S. PATENT DOCUMENTS

| 5,673,031 | A | * | 9/1997 | Meier |
| 5,845,117 | A | * | 12/1998 | Fujita |
| 5,983,114 | A | * | 11/1999 | Yao et al. |
| 5,987,011 | A | * | 11/1999 | Toh |

* cited by examiner

Primary Examiner—Nguyen T. Vo
Assistant Examiner—Nghi H. Ly

(57) ABSTRACT

A method of calculating a power threshold for a secondary communication channel capable of operating in DTX mode in forward or reverse links so that the communication channel is prevented from entering a deadlock state. Power threshold information for an associated primary channel and the secondary channel are used to update the established power threshold for the communication channel. The updated power threshold for the communication is thus calculated by combining previously established thresholds for the communication channel and associated primary channel with a current established threshold for the associated primary channel.

8 Claims, 2 Drawing Sheets

POWER CONTROL OF A COMMUNICATION TRAFFIC CHANNEL WITH DISCONTINUED TRANSMISSION IN THE PRESENCE OF A PRIMARY TRAFFIC CHANNEL

BACKGROUND OF THE INVENTION

1. Field of the Invention

The present invention is generally related to communication systems and in particular to wireless communication systems.

2. Description of the Related Art

Communication systems, and in particular, wireless communication systems comprise a plurality of communication links through which subscribers of such systems communicate with each other and with the system. A link typically comprises a plurality of communication channels such as signaling channels and traffic channels. Traffic channels are communication channels through which users of the communication system convey (i.e., transmit and/or receive) user information. Signaling channels are used by the system equipment to convey signaling information used to manage, operate and otherwise control the system. The system equipment, which are typically owned, maintained and operated by a service provider, are various well known radio and processing equipment used in communication systems. The system equipment along with user equipment (e.g., cell phone) generate and receive the signaling information.

Communication signals transmitted and received via communication links are often distorted by various anomalies that exist in the communication channels causing the signals to be received erroneously. The channel anomalies (e.g., fading, frequency translation, phase jitter) often cause the signals to lose power so that a signal is received at a significantly lower power level than it was transmitted. As a result, signals adversely affected by channel anomalies are often received with errors. One effective way of preventing errors from occurring or at least reduce the likelihood of errors occurring is the application of power control techniques by communication systems.

One power control technique—called the outer loop power control scheme—is often used by communication systems to adjust the transmission power level of transmitted signals to compensate for the effects of channel anomalies. For example, a signal being transmitted by a cell phone (or other user equipment), that is part of a Code Division Multiple Access (CDMA) wireless communication system, is received by a base station which measures the power level of the received signal and transmits it back to the cell phone. The base station sets a power threshold level and transmits this value to the cell phone to allow the cell phone to adjust (i.e., increase, decrease or maintain) the transmission power level of the signal such that it is received by the base station with a power level that is at or above the set threshold. The threshold is selected so that the base station receives the signal at an appropriate power level that tends to reduce the occurrence of errors. An outer loop power control scheme can thus be established in a reverse link; a reverse link is a communication link over which user equipment (e.g., cell phone, wireless laptop) transmits information to system equipment such as a base station. Also, a similar outer loop power control scheme can be established in a forward link; a forward link is a communication link over which system equipment transmits information to user equipment. Although the use of an outer loop power control scheme to address the problems caused by channel anomalies is reasonably effective, such a technique requires constant monitoring of the traffic channels. The power control scheme can be used in other types of wireless communication systems such as Time Division Multiple Access (TDMA) systems and Frequency Division Multiple Access (FDMA) systems.

Communication links in wireless communication systems such as CDMA systems comprise primary channels and secondary channels. Primary channels are communication channels in which communication signals are transmitted continuously; that is, even when no information is being conveyed over such primary channels, communication signals are being transmitted through such channels. Also, signaling information, which is used to establish, maintain and terminate communication between a user and system equipment, is conveyed only over primary channels. Once communication is established between a user and a base station, communication signals are conveyed continuously over the primary channels until the communication is terminated. Communication is established between a user and a base station when both the user and the base station follow procedures of a protocol for allocating system resources to the user to allow the user to use the communication system. The protocol is typically part of an established standard with which the communication system complies.

Secondary channels are additional channels that are mainly used to provide higher data rates to a user. For example, a user that is communicating voice over a primary channel may be provided with secondary channels to convey data. Typically, secondary channels convey only user information (e.g., data) and no signaling information. Secondary channels are often used in soft handoffs. In a soft handoff scenario, a user transmits information that is received by several base stations over a reverse link. The channel of the reverse link over which communication signals are being transmitted continuously and over which signaling information is conveyed is the primary channel. A reverse link (or forward link) may contain more than one primary channel. The other channels of the reverse link are the secondary channels. The primary channels and secondary channels are part of respective active sets of channels. The primary channels and the secondary channels consist of channel connections. The active set of primary channels and the active set of secondary channels are allocated to a particular user for established communications between the user and one or more base stations. The base stations (or a sector of a cell) are members of the active set; i.e., the members are mapped (i.e., connected) to channel connections. The number of members in the active sets of the primary and secondary channels are not necessarily equal. Communication channels that are assigned to the same members and the same user are said to be associated with each other; that is, communication channels that are in the same active set are associated with each other. Also, communication signals that are in different active sets but convey information from a common user and/or common members are also associated with each other. For example, a secondary channel can be associated with a primary channel; even though they are in different active sets, they convey information to the same user and the same members (i.e., base stations). Sometimes the secondary channel uses a subset of the primary channel active set, but typically the active sets share the same members.

The several base stations process the received user information and determine the quality of the received user information. The quality of the user information is often defined in terms of the Frame Error Rate (FER). User information is formatted as frames or blocks of information (e.g., blocks of bits). A frame that contains an error is called a bad frame or an erroneous frame. The ratio of the number of bad frames received to the total number of frames received for a defined period of time is called the Frame Error Rate. In soft handoff, several base stations process the received frames and the received frame that contains no errors (or the least amount of errors) is selected. Thus, the use of soft handoff tends to improve the FER of a user. However, the proper amount of power has to be allocated by the base stations and by the user equipment in order to transmit communication signals (containing frames of information) over both the primary and secondary channels. Also, transmission of communication signals over secondary channels introduces interference to other primary and secondary channels of other users.

In an effort to use power efficiently and reduce the occurrence of interference, communication systems have adopted a Discontinuous Transmission (DTX) protocol for the secondary channels. Unlike the primary channels, the secondary channels using DTX do not transmit signals continuously. In fact, there are periods when no signals are transmitted over such secondary channels. During such times, the interference due to the secondary channels in DTX mode is eliminated and no power is being expended unnecessarily. Typically, in DTX, the receiving equipment does not know when the transmitting equipment has entered DTX mode. Therefore, the receiving equipment has to rely on some type DTX mode detector. An example of a DTX mode detector is a device or method that measures the level of received power which is compared to a threshold. Typically, a DTX threshold is set by the receiving equipment and when signals being received over a secondary channel have a power level that is below the DTX threshold, the channel is declared to be in DTX mode. In DTX mode, received signals are not processed. However, DTX detectors are not fully reliable. In other words, a DTX detector may incorrectly label a signal as a DTX signal (meaning no signal transmitted) where in fact a signal was actually transmitted. Conversely, a DTX detector may fail to detect DTX (and label the received signal as a frame error) despite the fact that the transmitting equipment has entered DTX mode. Once DTX mode is declared, the outer loop power control is suspended and thus the transmission power level of transmitted signals is not adjusted. However, the use of DTX often leads to a problem called a deadlock state. A deadlock state occurs when received signals experience a deep fade (abrupt decrease in received signal power) that is incorrectly interpreted by receiving equipment as DTX mode. As a result, the quality of the secondary channel having signals experiencing deep fades steadily worsens (e.g., FER increases) because power for such signals is not adjusted and such signals are not even processed by the receiving equipment. The secondary channel can remain in the deadlock state indefinitely resulting in a great loss of information and link capacity. The quality of the secondary channel will continue to worsen and the channel will remain in this deadlock state until the power level of the signals rises above the DTX threshold at which point the outer power control scheme would again be applied. What is therefore needed is a method of practicing outer loop power control that prevents communication channels that can operate in DTX mode from entering a deadlock state.

SUMMARY OF THE INVENTION

The present invention provides a method that helps to prevent a communication channel that can operate in DTX mode from entering into a deadlock state. When it is determined that the communication channel is in DTX mode, an updated power threshold for the communication channel is calculated from (1) a power threshold previously established for the communication channel; (2) a power threshold previously established from an associated primary channel and (3) a current power threshold established for the associated primary channel. The established power thresholds are based on power threshold information for the communication channel and the associated primary channel. The updated power threshold for the communication channel is thus calculated by combining previously established power thresholds for the communication channel and an associated primary channel with a current power threshold for the associated primary channel. Once the updated power threshold is calculated, communication signals conveyed over the communication channel will have power levels at or above the updated power threshold. Therefore, the power level of communication signals conveyed over the communication channel will tend to be above a DTX threshold level for the communication channel thereby preventing the communication channel from entering into a deadlock state.

DETAILED DESCRIPTION

The present invention provides a method that helps to prevent a communication channel that can operate in DTX mode from entering into a deadlock state. When it is determined that the communication channel is in DTX mode, an updated power threshold for the communication channel is calculated from (1) a power threshold previously established for the communication channel; (2) a power threshold previously established from an associated primary channel and (3) a current power threshold established for the associated primary channel. The established power thresholds are based on power threshold information for the communication channel and the associated primary channel. The updated power threshold for the communication channel is thus calculated by combining previously established power threshold levels for the communication channel and an associated primary channel with a current threshold for the associated primary channel. Once the updated power threshold is calculated communication signals conveyed over the communication channel will have power levels at or above the updated threshold. The resulting updated power threshold will thus be adjusted in concert with varying power level conditions in the channel and its associated primary channel. Therefore, the power level of communication signals conveyed over the communication channel will tend to be above a DTX threshold level for the communication channel thereby preventing the communication channel from entering into a deadlock state.

For ease of explanation and for illustration purposes only, the method of the present invention will be explained in the context of a reverse link and a forward link that couple a user equipment in soft handoff with three base stations that are part of a CDMA wireless communication system. It will be readily understood, however, that the method of the present invention is not at all limited to CDMA wireless communication systems. The method of the present invention is applicable to other types of wireless communication systems (e.g., FDMA, TDMA) as well as to wireline communication systems.

Figure 1:
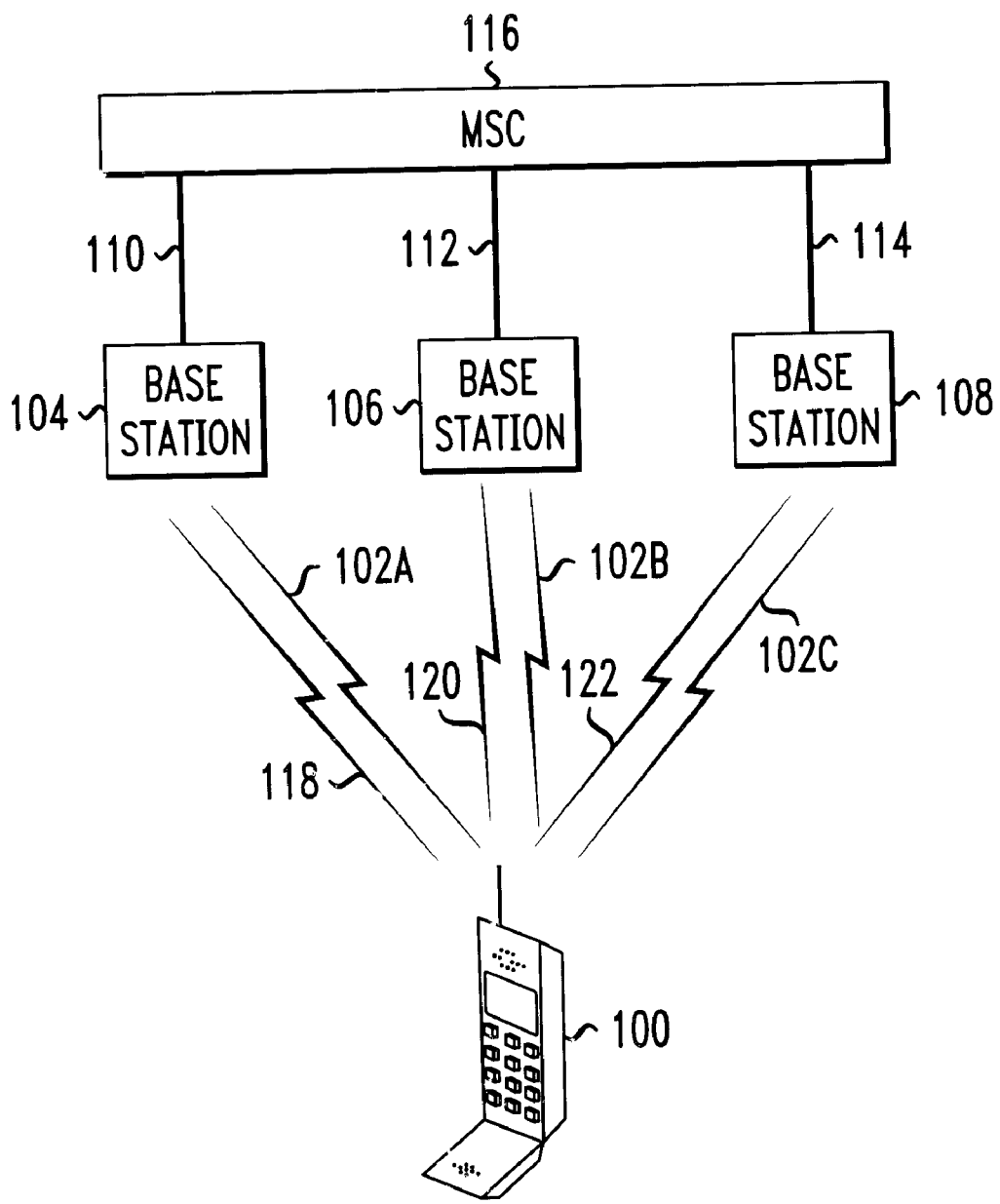
FIG. 1 depicts the reverse link channels and a portion of a wireless communication system to which the method of the present invention is applied.

Referring to FIG. 1, there is shown a reverse link connection between user equipment 100 and base stations 104, 106 and 108. User equipment 100 is in soft handoff with base stations 104, 106 and 108. The base stations are coupled to Message Switching Center (MSC) 116 via communication links 110, 112 and 114 respectively. MSC 116, base stations 104, 106 and 108 and the communication links connecting them are part of a CDMA wireless communication system. An MSC is typically a set of system equipment that interfaces between a wireless communication system and other systems for routing communication signals between the two communication systems. The reverse link comprises primary channel connections 102A, 102B and 102C and secondary channel active set comprising channel connections 118, 120 and 122. Primary channel 102 has three active channel connections, viz., 102A, 102B and 102C. The power control method of the present invention is performed by MSC 116 and applied to the secondary channel having active set channel connections 118, 120 and 122.

User equipment 100 transmits information over the primary channel and such information is received by the base stations via the primary channel connections. The information transmitted by user equipment 100 comprise user information and signaling information. The user information transmitted by user equipment 100 is received by each of the three base stations which transfers such information to MSC 116. Only one of the base stations processes the signaling information transmitted by user equipment 100. Base station 106 processes the signaling information and communicates its processing results to MSC 116 over communication link 112. Base station 106 is therefore referred to as a primary base station. Base stations 104 and 108 do not process signaling information from user equipment 100. Base stations 104 and 108 are part of the soft handoff being implemented by the communication system. It will be understood that the method of the present invention is not limited to a primary base station architecture as discussed above. The method of the present invention is applicable to other architectures that do not use or contain primary base stations. The user information received by MSC 116 from the base stations is processed and MSC 116 selects the information having the best quality. The quality of service is defined by the service provider of the communication system. The method of the present invention can be implemented at any of the base stations, or at MSC 116 or any combination thereof. For ease of explanation only, it will be assumed that the method of the present invention is implemented at MSC 116 for primary base station 106 having primary channel connection 102B and secondary channel connection 120.

The base stations receive information in the form of frames at discrete time instances k where k serves as an index for specifying a particular frame; k is an integer equal to 1 or greater. In the first step of the method of the present invention, power thresholds for secondary channel of active set members 118, 120, 122 and primary channel 102 are established. Also, a DTX power threshold is established. The established power thresholds are based on received power threshold information. In particular, power thresholds for primary channel 102 and associated secondary channel connection 120 are established from power threshold information received over primary channel 102. Also, power thresholds for the other members (118, 122) of the secondary channel are established. The power threshold information are power level measurements of communication signals conveyed over the primary and secondary channels respectively and information generated from the processing of such power level measurements. For example, base stations 104, 106 and 108 contain equipment that measure the power levels of communication signals conveyed over their primary and secondary channels. The base stations compare the measured power levels to power levels associated with an acceptable FER. The result of the comparison along with power level measurements are the power threshold information. It should also be noted that base stations 104, 106 and 108 can report the power level measurements (of the primary and secondary channels) to MSC 116 which in turn compares the measurements to levels having an acceptable FER. Thus, the power threshold information can be generated at the base stations or at the MSC. The established power thresholds are set by MSC 116 such that the FER of signals received over primary channel 102 and secondary channel connection 120 is acceptable. An acceptable FER is defined by a service provider based on the quality of service requested by users of the system or on a quality of service established by the service provider.

The established power threshold for the primary channel 102 at instant k is $P(k)$. The established power threshold level for the secondary channels at instant k is $S(k)$. $P(k)$ and $S(k)$ are established from (1) power level measurement information for primary channel 102 and secondary channel connection 120 respectively received by MSC 116 and (2) an FER deemed acceptable by the service provider. For example, for secondary channel 120, $S(k)$ is established to be 5.0 dB because MSC 116 has received information over primary channel 102 (or from the base stations) indicating that the average power level of signals having an acceptable FER which are received over secondary channel connection 120 is 4.7 dB. Thus, the power threshold information indicates that a 4.7 dB power level is associated with an acceptable FER. MSC 116 can thus establish $S(k)$ by selecting a threshold value that is equal to or slightly higher than 4.7 dB (say 5.0 dB) to maintain or obtain the acceptable FER; that is, the 4.7 dB power level is associated with an acceptable FER. A similar procedure can be followed for establishing $P(k)$. It should be noted that other procedures for establishing power thresholds can be used as long as such procedures result in information being conveyed with an acceptable FER. A DTX threshold level is set by the system for the secondary channels. The DTX threshold level is below $S(k)$ and $P(k)$ and is chosen by the service provider such that the FER of the primary and secondary channels is acceptable when such channels operate at power levels above this threshold. The DTX threshold level indicates a power value that is used to determine whether an established communication channel is in DTX mode.

Having established the DTX threshold level, the primary channel threshold level and the secondary channel threshold level, MSC 116 now applies the second step of the method of the present invention at the next time instant (k+1) to calculate an updated power threshold level (i.e., $S(k+1)$) for secondary channel connection 120. Focusing on secondary channel connection 120, MSC 116 determines whether secondary channel connection 120 is in DTX mode at time instant k+1. Secondary channel connections 118 and 122 follow the same procedure for determining whether they are in DTX mode. The power level of communication signals conveyed over all associated secondary channels is obtained. If the power levels of the communication signals for secondary channel connection 120 and all its associated secondary channels are below the DTX threshold level, then the secondary channel is declared to be in DTX mode. If the measured power level of the communication signals of secondary channel connection 120 is above the DTX threshold level or if the measured power level of the communication signals of at least one of the associated secondary channels is above the DTX threshold, then secondary channel 120 is declared not to be in DTX mode. MSC 116 also establishes the current power threshold level for primary channel 102, i.e., P(k+1), in the same manner as described above for P(k) and S(k).

In accordance with the method of the present invention, MSC 116 then calculates an updated power threshold for secondary channel connections 118,120 and 122 based on (1) previously established power threshold (i.e., P(k)) for associated primary channel 102; (2) previously established power threshold (i.e., S(k)) for secondary channel 120 and current established power threshold level (i.e., P(k+1)) for associated primary channel 102. In other words, P(k), S(k) and P(k+1) are combined to establish an updated power threshold level, viz., S(k+1, for secondary channel 120. In particular S(k+1)=P(k+1)+S(k)−P(k) thereby tending to prevent secondary channel 120 (currently in DTX mode) from entering into a deadlock state. The same approach can be used to calculate an updated power threshold for secondary channels 118 and 122 when they are also in DTX mode. It should be noted that the established thresholds for the primary channel and secondary channel at time instants k and k+1 can be combined in various other manners. For example, S(k+1) can be any linear combination of P(k+1), S(k) and P(k).

Figure 2:
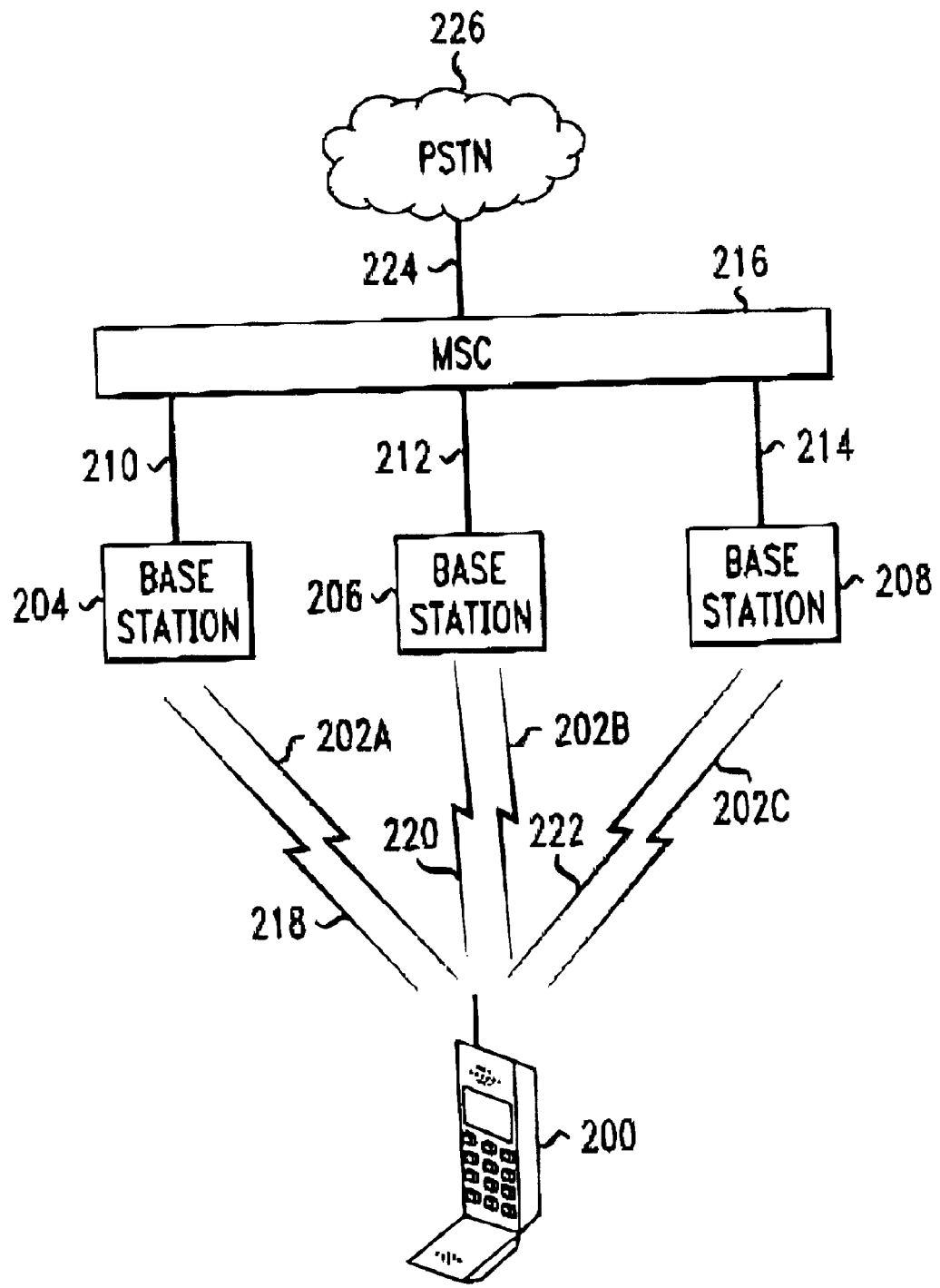
FIG. 2 depicts forward link channels and a portion of a wireless communication system coupled to a Public Switched Telephone Network to which the method of the present invention is applied.

Referring now to FIG. 2, the method of the present invention is applied to forward links of part of a wireless communication system. Traffic and signaling information from Public Switched Telephone Network (PSTN) 226 destined for user equipment 200 is received by MSC 216 via link 224. MSC 216 processes the traffic and signaling information and determines that the destination of the information is user equipment 200. Assuming that base station 206 is a primary base station, MSC 216 transmits the signaling information and the traffic information to base station 204, 206 and 208 via communication link 210, 212 and 214 respectively. Base station 206 transmits signaling information to user equipment 200 via primary communication channel connection 202. Note that primary channel 202 has connections 202A, 202B and 202C. Base stations 204, 206 and 208 transmit traffic information over secondary channel connections 218, 220 and 222 respectively to user equipment 200.

User equipment 200 receives information in the form of frames at discrete time instants k where k serves as an index for specifying a particular frame. Initially, power threshold levels for primary channel 202 and associated secondary channel 220 are established from power threshold information received (by user equipment 200) over primary channel 202. The established power thresholds for the primary channel 202 at instant k is P(k). The established power threshold level for the secondary channels at instant k is S(k). P(k) and S(k) are established from (1) power level measurement information for primary channel 202 and secondary channel 220 respectively received by user equipment 200 and (2) an FER deemed acceptable by user equipment 200 or the service provider. For example, for secondary channel 220, S(k) is established to be 5 dB because user equipment 200 has received information from the base stations (over primary channel 202) indicating that the average power level of signals having an acceptable FER which are received over secondary channel 120 is 4.8 dB.

User equipment 200 can thus establish S(k) to be slightly higher than 4.8 dB (say 5 dB) to maintain or obtain the acceptable FER.

A similar procedure can be followed for establishing P(k). It should be noted that other procedures for establishing power thresholds can be used as long as such procedures result in information being conveyed with an acceptable FER. A DTX threshold level is set by user equipment 200 for the secondary channels. The DTX threshold level is below S(k) and P(k) and is chosen by user equipment 200 (or the service provider) such that the FER of the primary and secondary channels is acceptable when such channels operate at power levels above this threshold.

Having initially established the DTX threshold level, the primary channel threshold level and the secondary channel threshold level, user equipment 200 can now apply the method of the present invention at the next time instant (k+1) to calculate an updated power threshold level (i.e., S(k+1)) for secondary channel 220. Focusing on secondary channel 220, user equipment 200 determines whether secondary channel 220 is in DTX mode at time instant k+1. The power level of communication signals conveyed over all associated secondary channels (i.e., channels 218, 220 and 222) is obtained. If the power levels of the communication signals for secondary channel 220 and all its associated secondary channels are below the DTX threshold level, then secondary channel is declared to be in DTX mode. If the measured power level of the communication signals of secondary channel 120 is above the DTX threshold level or if the measured power level of the communication signals of at least one of the associated secondary channel is above the DTX threshold, then secondary channel 220 is declared not to be in DTX mode. User equipment 200 also establishes the current power threshold level for primary channel 202, i.e., P(k+1), in the same manner as described above for P(k) and S(k).

User equipment 200 contains equipment that measure the power levels of communication signals conveyed over its primary and secondary channels. User equipment 200 then compares the measured power levels to power levels associated with an acceptable FER. The result of the comparison along with power level measurements are the power threshold information.

In accordance with the method of the present invention, user equipment 200 then calculates an updated power threshold for secondary channel 220 based on (1) previously established power threshold (i.e., P(k)) for associated primary channel 202; (2) previously established power threshold (i.e., S(k)) for secondary channel 220 and current established power threshold level (i.e., P(k+1)) for associated primary channel 202. In other words, P(k), S(k) and P(k+1) are combined to establish an updated power threshold level , viz., S(k+1), for secondary channel 220. In particular S(k+1)=P(k+1)+S (k)−P(k) thereby tending to prevent secondary channel 120 (currently in DTX mode) from entering into a deadlock state. The same approach can be used to calculate an updated power threshold for secondary channels 218 and 222.

We claim:

1. A method of performing power control for a communication channel with DTX mode capability, the method comprising the steps of:

establishing power thresholds for the communication channel and its associated primary channel; and calculating an updated power threshold for the communication channel when the communication channel is in DTX mode where the updated power threshold is based on received power threshold information for the communication channel and its associated primary communication channel.

2. The method of claim 1 where the steps are performed at an MSC of a wireless communication system.

3. The method of claim 1 where the steps are performed at a base station of a wireless communication system.

4. The method of claim 1 where the steps are performed by user equipment of a wireless communication system.

5. The method of claim 1 where the communication channel and associated communication channels are secondary channels with DTX mode capability.

6. The method of claim 1 where the step of establishing power threshold information comprises:

receiving power level measurement information for the communication channel and its associated primary channel; and selecting a threshold that is based on the power level measurement information and which is associated with an acceptable FER.

7. The method of claim 1 where the step of calculating an updated power threshold comprises combining previously established thresholds for the communication channel and its associated primary communication channel with a current established threshold for the primary communication channel based on the received power threshold information.

8. The method of claim 7 where the established power threshold for the communication channel based on information received at time instant k is $P(k)$ and the established power threshold for the associated primary channel based on information received at time instant k is $S(k)$ and the established power threshold for the primary channel based on information received at time instant $(k+1)$ is $P(k+1)$ and where the calculated power threshold for the communication channel at time instant $(k+1)$ is $S(k+1)$ where $S(k+1)=P(k+1)+S(k)-P(k)$ and k is an integer equal to 1 or greater.

* * * * *